UNITED STATES PATENT OFFICE.

EDMUND L. ZUKOSKI, OF ST. LOUIS, MISSOURI.

PROCESS FOR MAKING CONCRETE.

1,316,071.              Specification of Letters Patent.     Patented Sept. 16, 1919.

No Drawing.         Application filed May 29, 1916. Serial No. 237,334.

*To all whom it may concern:*

Be it known that I, EDMUND L. ZUKOSKI, a citizen of the United States, residing in the city of St. Louis and the State of Missouri, have invented a new and useful Process for Making Concrete, of which the following is a full, clear, and exact specification.

My invention relates to concrete to be used in the construction of structures of various kinds, but which is especially suitable for use where lightness as well as strength is a desideratum. One of the objects of my invention is to produce a concrete that is light and strong enough to be suitable for the construction of roofs, partitions, and other parts of buildings; and another object is to produce a concrete that is especially adapted for use in the construction of ships and other objects where lightness is especially desired in connection with strength.

In making concrete it is customary to mix broken stone, gravel or cinders, and sand, and cement with water; then pour the mixture into a form and allow it to become hard or set. The stone, gravel or cinders serves as a filling whose parts are bound together by the cement, and the sand serves simply to aid in filling the interstices between the larger particles of stone or gravel. The mixture of broken stone or gravel, sand, and cement must be wet in order that there may be the necessary chemical action for the mass to set or become hard. The strength of concrete depends upon the strength of the cement and how effectively the sand and pieces of stone are cemented or bound together by the cement. In order to have a strong concrete it is absolutely necessary that the cement shall adhere to the pieces of stone or gravel so as to bind them one to the other. Ordinary concrete weighs about 150 pounds per cubic foot or has a density about 2½ times that of water, and hence ordinary concrete will not float in water. The weight of a cubic foot of concrete, having a certain proportion of stone or gravel of a given size, depends very largely upon the density of the stone or rock used in making it: a light stone or rock makes a light concrete, and a heavy stone or rock makes a heavy or dense concrete. The larger is the proportion of stone to that of sand and cement used in the concrete, the more nearly will the density of the concrete approach that of the stone or rock used in making the concrete. It is evident, therefore, that if a concrete could be made which contains light or porous pieces of stone, or some similar substance, instead of solid pieces of stone or rock, and if these light pieces could be firmly bound together by means of a mixture of sand and cement, without the sand or cement entering into and filling the pores of the larger pieces of rock, or similar substance, a porous and light concrete, or concrete-like substance, would be formed. The strength of such a concrete-like substance would depend upon the adhesion of the cement to the larger porous pieces and also upon the strength of these larger porous pieces themselves.

In my improved method of making concrete I use as a filling a porous substance, such as pumice stone, instead of solid rock or gravel. I break the pumice stone into pieces that will pass through, preferably, a ring two and one-half inches in diameter, and then I mix this broken pumice stone with cement, using, preferably, in place of sand, the fine, sand-like particles of the pumice stone. I may use also some sand with the fine particles of pumice stone to fill the interstices between the larger pieces of pumice stone. I find that the proportions of cement, sand or fine particles of pumice stone, and larger pieces of pumice stone may be varied between wide limits and yet give a concrete that is suitable for use, it being understood, of course, that a proportion of cement, sand and broken pumice stone that would be best suitable for one purpose might not be best suitable for a different purpose.

In order to get the benefits of my improved process for making concrete it is necessary that the cement or sand be prevented from entering and filling the pores and spaces in the larger pieces of pumice stone. If the sand or cement entered into and filled the pores and spaces in the larger pieces of pumice stone the concrete would not have that lightness which I desire. It is understood, of course, that water must be added to the mixture of cement, sand, and broken pumice stone so that the mixture will become sufficiently wet to bring about the chemical change necessary for the mass to set or become hard.

I find that by mixing the sand and cement and then adding water to this mixture, using great care not to make the mixture too wet, and then mixing with the wet mixture the required proportion of broken pumice stone, I avoid filling, to a large degree, the inner pores and interstices of the larger particles of pumice stone, and I thus secure a concrete that is exceedingly light and which is also strong enough to use in making partitions, roofs and other structures where lightness is desirable. This method of carrying out my process of making a light concrete is somewhat difficult because of the care required to avoid getting the sand and cement too wet while at the same time having it sufficiently wet to insure that the mass will properly set. I prefer, therefore, to take the larger particles of pumice stone and treat them so as to close the pores at the surface thereof and then use the particles thus treated with sand, cement and water to make a concrete in the usual way as though ordinary concrete were being made. I find that if the larger pieces be treated by immersing them in water glass, sodium silicate, or a solution of sodium silicate, and then allow them to dry, the larger pieces of pumice stone thus treated have a surface coating that prevents wet sand or cement from entering the interior of the pumice stone and, further, that the cement adheres tightly to the pieces of pumice stone thus treated. The solution of sodium silicate need not be very strong to give satisfactory results, and I find that if the solution be made in the proportion of one part sodium silicate to three or, even in some cases, four parts of water very good results may be obtained. I prefer to use a solution of sodium silicate because this substance is cheap and is easily worked. While I prefer to use pumice stone because of its cheapness and lightness I may, also, use any kind of a porous substance, first, of course, treating it so as to close its pores at the surface so as to prevent the filling of them by sand or cement when making the concrete. Pumice stone is especially suitable for use because it is so easy to treat it to close its pores at the surface, and because an exceedingly light and strong concrete can be made with it. I find that it is possible to make with pumice stone, following my improved process, a concrete whose density is less than that of ordinary oak or even yellow pine, so that a solid block of concrete made with pumice stone according to my process will float when put in water.

What I claim as new and desire to secure by Letters Patent, is:

1. A process of forming concrete which consists in forming a mixture comprising water and cement and pieces of a rigid porous body, preventing the water and cement from entering the interior of said pieces, placing said mixture into a form, and allowing said mixture to set.

2. A concrete made of a mixture comprising water and cement and pieces of a rigid porous body, said pieces having been treated to prevent the entrance into the interior thereof of any substantial amount of water or cement.

3. A concrete made of a mixture comprising water and cement and pieces of a rigid porous body which have been treated with a solution of water glass.

4. A concrete whose aggregate is composed of rigid porous bodies having their exterior surfaces covered with a coating of water glass and having their interior pores substantially empty and free from any foreign material.

5. A concrete whose aggregate is composed of pieces of pumice-stone having their exterior surfaces covered with a coating of water glass and having their interior pores substantially empty and free from any foreign material.

In witness whereof I have signed my name to this specification.

EDMUND L. ZUKOSKI.

Copies of this patent may be obtained for five cents each, by addressing the "Commissioner of Patents, Washington, D. C."